US006205844B1

(12) United States Patent

Morita et al.

(10) Patent No.: US 6,205,844 B1
(45) Date of Patent: Mar. 27, 2001

(54) COMBUSTION STATE DETECTING DEVICE FOR AN INTERNAL COMBUSTION ENGINE

(75) Inventors: Shingo Morita; Koichi Okamura; Mituru Koiwa; Yutaka Ohashi, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/322,024

(22) Filed: May 28, 1999

(30) Foreign Application Priority Data

Jan. 19, 1999 (JP) ........................................ 11-010815

(51) Int. Cl.[7] ........................................ G01L 23/22

(52) U.S. Cl. ........................................ 73/35.08

(58) Field of Search ........................ 73/35.08, 35.16, 73/35.01, 116, 117.2, 117.3, 35.14; 123/630, 425; 324/399, 402

(56) References Cited

U.S. PATENT DOCUMENTS 5,220,901 * 6/1993 Morita et al. ........................ 123/604
5,701,876 * 12/1997 Morita et al. ........................ 123/630
5,747,670 * 5/1998 Takahashi et al. .................. 73/35.08
5,785,020 * 7/1998 Takahashi et al. .................. 123/425
5,861,551 * 1/1999 Morita et al. ........................ 73/116
6,075,366 * 6/2000 Yasuda .............................. 73/35.08

FOREIGN PATENT DOCUMENTS 4-194367 7/1992 (JP) .

* cited by examiner

*Primary Examiner*—Helen Kwok
(74) *Attorney, Agent, or Firm*—Sughrue, Mion, Zinn, Macpeak & Seas, PLLC

(57) ABSTRACT

A combustion state detecting device for an internal combustion engine enables diverse combustion state detection by obtaining a plurality of currents analogous to an ion current. The combustion state detecting device includes a bias circuit 6 that applies an ion current detection voltage to an ignition plug 3 disposed in a cylinder of the internal combustion engine, an ion current signal distributor circuit 20 made up of a current mirror circuit for detecting the ion current on the basis of a voltage from the bias circuit, and current-voltage converter circuits 21 and 22, to thereby produce a plurality of currents analogous to the ion current by the ion current signal distributor circuit.

10 Claims, 8 Drawing Sheets

COMBUSTION STATE DETECTING DEVICE FOR AN INTERNAL COMBUSTION ENGINE

BACKGROUND OF THE INVENTION

1. Field of the Invention

The present invention relates to a combustion state detecting device that detects a combustion state of an internal combustion engine by detection of a change in the quantity of ions which are produced at the time of burning in the internal combustion engine, and more particularly to a combustion state detecting device for an internal combustion engine which is capable of diversifying detection functions by producing a plurality of currents analogous to an ion current to be detected.

2. Description of the Related Art

In general, in an internal combustion engine driven by a plurality of cylinders, the fuel-air mixture consisting of air and fuel introduced into the combustion chambers of the respective cylinders is compressed by moving up pistons, electric sparks are generated by applying an ignition high voltage to ignition plugs located in the respective combustion chambers, and an explosion force developed at the time of burning the fuel-air mixture is converted into a piston push-down force, to thereby extract the piston push-down force as an rotating output of the internal combustion engine.

There has been known that since molecules within the combustion chambers are ionized when the fuel-air mixture has been burned within the combustion chambers, ions having electric charges flow between the ignition plugs as an ion current upon application of a bias voltage to ion current detection electrodes (as usual, ignition plug electrodes are used) located within the combustion chambers.

Also, there has been known that the combustion state of the internal combustion engine can be detected by detection of a state in which the ion current occurs because the ion current is sensitively varied according to the combustion state within the combustion chambers.

FIG. 6 is a structural diagram showing one example of a conventional combustion state detecting device for an internal combustion engine.

In the figure, one end of a primary winding 1*a* of an ignition coil 1 is connected to a power supply terminal VB whereas the other end thereof is connected to the ground through a power transistor 2 having an emitter thereof grounded, which serves as a switching element for interrupting the supply of a primary current I1.

A secondary winding 1*b* of the ignition coil 1 constitutes a transformer in cooperation with the primary winding 1*a*, and a high-voltage side of the secondary winding 1*b* is connected to one end of an ignition plug 3 corresponding to each cylinder (not shown) to output a high voltage of negative polarity at the time of controlling ignition.

Each ignition plug 3 made up of counter electrodes is applied with an ignition high voltage to discharge and fire the fuel-air mixture within each of the cylinders.

It should be noted that the ignition coil 1 and the ignition plug 3 are disposed in parallel for each of the cylinders, however, in this example, only one pair of ignition coil 1 and ignition plug 3 are representatively shown.

A low-voltage side of the secondary winding 1*b* is connected to a bias circuit 6 through a resistor 4 and a diode 5 which are connected in parallel and constitute current limiting means.

The resistor 4 suppresses a discharge current that flows into the ignition plug 3 through the secondary winding 1*b* from the bias circuit 6 and suppresses a voltage developed at the high-voltage side of the secondary winding 1*b* at the time of starting the supply of the current to the primary winding 1*a*.

The diode 5 is provided so that a direction in which the secondary current (ignition current) flows at the time of applying the ignition high voltage becomes forward, and is arranged so as to suppress a potential difference between both ends of the resistor 4 at the time of controlling ignition.

The bias circuit 6 applies a bias voltage of a polarity reverse to the ignition polarity, that is, the positive polarity to the ignition plug 3 through the resistor 4 and the secondary winding 1*b* to substantially detect an ion current corresponding to the quantity of ions generated at the time of burning.

The bias circuit 6 is connected to a current-voltage converter circuit 7, and the current-voltage converter circuit 7 converts the ion current allowed to flow by the bias voltage into a voltage and applies the voltage thus converted to a voltage signal distributor circuit 8 as an ion current detection signal.

The voltage signal distributor circuit 8 distributes the ion current detection signal (ion signal) which has been converted into a voltage to a knock detection signal generator circuit 9 that extracts a knock signal from the ion signal and a combustion/misfire signal generator circuit 10 that produces a signal used for judging combustion/misfire according to the ion signal, respectively.

Then, output signals from the knock detection signal generator circuit 9 and the combustion/misfire signal generator circuit 10 are supplied to an ECU (electronic control unit) 11. The ECU 11 judges the combustion state of the internal combustion engine on the basis of the output signal from the combustion/misfire signal generator circuit 10, and conducts adaptive control appropriately so as not to cause inconvenience when detecting the deterioration of the combustion state.

Also, the ECU 11 arithmetically operates an ignition timing, etc., on the basis of drive conditions obtained from a variety of sensors (not shown) such as the knock detection signal generator circuit 9 or a crank angle sensor 12 to output not only an ignition signal V1 to the power transistor 2 but also a fuel injection signal to an injector (not shown) for each of the cylinders and drive signals to a variety of actuators (a throttle valve, an ISC valve, etc.)

FIG. 7 is a circuit structural diagram showing an example of a specific circuit structure of the bias circuit, the current-voltage converter circuit and the voltage signal distributor circuit shown in FIG. 6.

In the figure, the bias circuit 6 includes a capacitor 6*a* connected to a low-voltage side of the secondary winding 1*b* through the resistor 4 and the diode 5 which are connected in parallel, a diode 6*b* disposed between the capacitor 6*a* and the ground, and a Zener diode 6*c* for limiting bias voltage which is connected in parallel with the capacitor 6*a*.

A series circuit consisting of the capacitor 6*a* and the diode 6*b* and the Zener diode 6*c* connected in parallel with the capacitor 6*a* are disposed between the low-voltage side of the secondary winding 1*b* and the ground through the diode 5 to constitute a charging path for charging the capacitor 6*a* with the bias voltage at the time of generating the ignition current.

The capacitor 6*a* is charged with the secondary current flowing therein through the ignition plug 3 which is discharged at a high voltage outputted from the secondary winding 1*b* when the power transistor 2 is off (when the supply of the current to the primary winding 1*a* is interrupted). The charge voltage is limited to a predetermined bias voltage (for example, about several hundreds V) by the Zener diode 6*c* and substantially functions as bias means for ion current detection, that is, a power supply.

A resistor 7*a* which is connected in parallel with the diode 6*b* and serves as the current-voltage converter circuit 7 converts the ion current allowed to flow by the bias voltage into a voltage, and supplies the voltage thus converted to the voltage distributor circuit 8 as the ion current detection signal.

The voltage signal distributor circuit 8 includes a plurality of buffers 8*a* and 8*b*, and the output side of the buffer 8*a* is connected to the knock detection signal generator circuit 9 while the output side of the buffer Bb is connected to the combustion/misfire signal generator circuit 10.

Subsequently, the operation of the conventional combustion state detecting device for an internal combustion engine shown in FIGS. 6 and 7 will be described with reference to FIGS. 8A to 8F.

In general, the ECU 11 arithmetically operates the ignition timing, etc., in accordance with the drive conditions, and supplies an ignition signal V1 (FIG. 8A) to the base of the power transistor 2 at a targeted control timing to control the on/off operation of the power transistor 2.

As a result, the power transistor 2 interrupts the supply of the primary current I1 (FIG. 8B) flowing in the primary winding 1*a* of the ignition coil 1 to boost the primary voltage, and also develops the ignition high voltage, that is, the secondary voltage V2 (FIG. 8C) of, for example, several tens kV at the high-voltage side of the secondary winding 1*b*.

The secondary voltage is applied to the ignition plug 3 in each of the cylinders and allowed to generate a discharge spark within the combustion chamber of the ignition control cylinder to burn the fuel-air mixture. At this time, if the combustion state is normal, a required quantity of ions are generated in the periphery of the ignition plug 3 and within the combustion chamber.

Then, as described above, when the power transistor 2 is turned on in response to the ignition signal V1, the supply of the current to the primary winding 1*a* starts, to thereby develop the voltage with the positive polarity at the high-voltage side of the secondary winding 1*b*.

At this time, since the discharge current from the capacitor 6*a* to the low-voltage side of the secondary winding 1*b* is limited by the resistor 4, the voltage developed at the secondary winding 1*b* is divided to the high-voltage side and the low-voltage side without being superimposed on the bias voltage.

At the time of starting the supply of a current to the primary winding 1*a*, even if the voltage of the positive polarity is developed at the high-voltage side of the secondary winding 1*b*, since the discharge current from the capacitor 6*a* to the low-voltage side of the secondary winding 1*b* is limited by the resistor 4 as described above, the voltage of the positive polarity developed at the high-voltage side of the secondary winding 1*b* is suppressed so that there is no case in which the ignition plug 3 discharges.

Sequentially, at the time of interrupting the primary current, if the ignition high voltage is developed at the high-voltage side of the secondary winding 1*b* to make the ignition plug 3 discharge, the secondary current I2 (FIG. 8D) then flows in a path of the ignition plug 3, the secondary coil 1*b*, the diode 5, the capacitor 6*a*, the diode 6*b* and the ground in the stated order to charge the capacitor 6*a* with a given voltage V3 (FIG. 8E).

When the charge voltage of the capacitor 6*a* reaches a given voltage value of the Zener diode 6*c*, the secondary current flows into the Zener diode 6*c* without flowing into the capacitor 6*a*, to thereby maintain the given bias voltage.

Upon the completion of the discharge by the ignition plug 3, the charge voltage of the capacitor 6*a* is applied to the ignition plug 3 through a path of the resistor 4 and the secondary coil 1*b* in the stated order so that the ion current flows in a path of the capacitor 6*a*, the resistor 4, the secondary coil 1*b*, the ignition plug 3 (ions in the ignition plug gap), the ground, the resistor 7*a* and the capacitor 6*a* in the stated order. The ion current is converted into a voltage by the resistor 7*a* to produce an ion signal SI (FIG. 8F).

The ion signal is distributed by the buffers 8*a* and 8*b* of the voltage signal distributor circuit 8, and the ion signal from the buffer 8*a* is supplied to the knock detection signal generator circuit 9 where a knock signal is produced. Also, the ion signal from the buffer 8*b* is supplied to the combustion/misfire signal generator circuit 10 where a combustion/misfire signal is produced.

Then, the output signals from the knock detection signal generator circuit 9 and the combustion/misfire signal generator circuit 10 are supplied to the ECU 11, and the ECU 11 produces and outputs a variety of control signals such as the above-described ignition signal and drive signals on the basis of the detection signal from those output signals and the detection signals from a variety of sensors (not shown) such as the crank angle sensor 12.

In the conventional combustion state detecting device for an internal combustion engine structured as described above, because the resistor is disposed in the path into which the ion current flows to conduct voltage conversion when the ion current is converted into a voltage, one dynamic range of the ion signal is determined by that resistor. However, the quantity of ion current is greatly different depending on the drive state of the internal combustion engine, and the peak value of the ion current is within a range of from several to several hundreds μA. Accordingly, there arise such problems that it is very difficult to conduct signal processing for detection of knocking, detection of combustion/misfire and detection of other combustion states, and also that a signal processing circuit at a post-stage becomes very complicated, etc.

SUMMARY OF THE INVENTION

The present invention has been made in order to solve the above problems inherent in the conventional device, and therefore an object of the present invention is to provide a combustion state detecting device for an internal engine which obtains a plurality of currents analogous to the ion current, thereby being capable of conducting diverse combustion state detection, and being capable of setting an appropriate dynamic range for the respective combustion state detection, resulting in an improvement in the property of diverse combustion state detection such as knock detection property or the combustion/misfire detection property.

In order to achieve the above object, according to a first aspect of the present invention, there is provided a combustion state detecting device for an internal combustion engine, comprising: ion current detection voltage generating means for applying an ion current detection voltage to an ignition plug disposed in a cylinder of the internal combustion engine; and ion current detecting means for detecting an ion current on the basis of a voltage from said ion current detection voltage generating means; wherein said ion current detecting means produces a plurality of currents analogous to the ion current.

According to a second aspect of the present invention, there is provided a combustion state detecting device for an internal combustion engine as set forth in the first aspect of the present invention, wherein: said ion current detection voltage generating means comprises: a capacitor which is charged by a current from the external to hold the voltage; a voltage limiting element that limits the charge voltage of said capacitor; and a rectifier element disposed between an electrode of said capacitor at a low potential side thereof and the ground, for making the current from said capacitor to flow out, and wherein: said ion current detecting means is formed of a current mirror circuit.

According to a third aspect of the present invention, there is provided a combustion state detecting device for an internal combustion engine as set forth in the first or second aspect of the present invention, wherein dynamic ranges are set on the plurality of currents analogous to the ion current produced by said ion current detecting means, respectively.

According to a fourth aspect of the present invention, there is provided a combustion state detecting device for an internal combustion engine as set forth in any one of the first to third aspects of the present invention, wherein knocking detection and combustion/misfire detection are effected by use of the plurality of currents analogous to the ion current produced by said ion current detecting means.

According to a fifth aspect of the present invention, there is provided a combustion state detecting device for an internal combustion engine as set forth in any one of the first to fourth aspects of the present invention, further comprising a voltage control circuit for feeding the voltage at a low-voltage side of said ion current detection voltage generating means back to 0 volt under control.

BRIEF DESCRIPTION OF THE DRAWINGS

These and other objects, features and advantages of this invention will become more fully apparent from the following detailed description taken with the accompanying drawings in which.

DETAILED DESCRIPTION OF THE PREFERRED EMBODIMENTS

Now, a description will be given in more detail of preferred embodiments of the present invention with reference to the accompanying drawings.

(First Embodiment)

Figure 1:
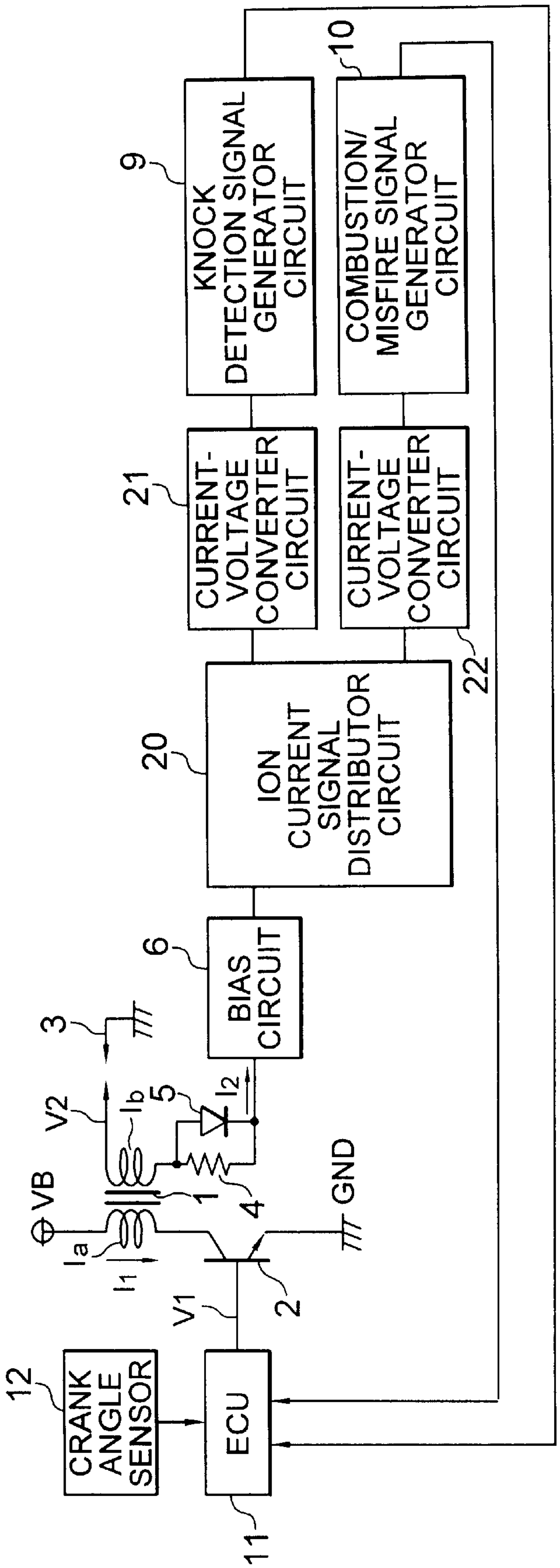
FIG. 1 is a structural diagram showing a combustion state detecting device for an internal combustion engine in accordance with a first embodiment of the present invention.
Figure 6:
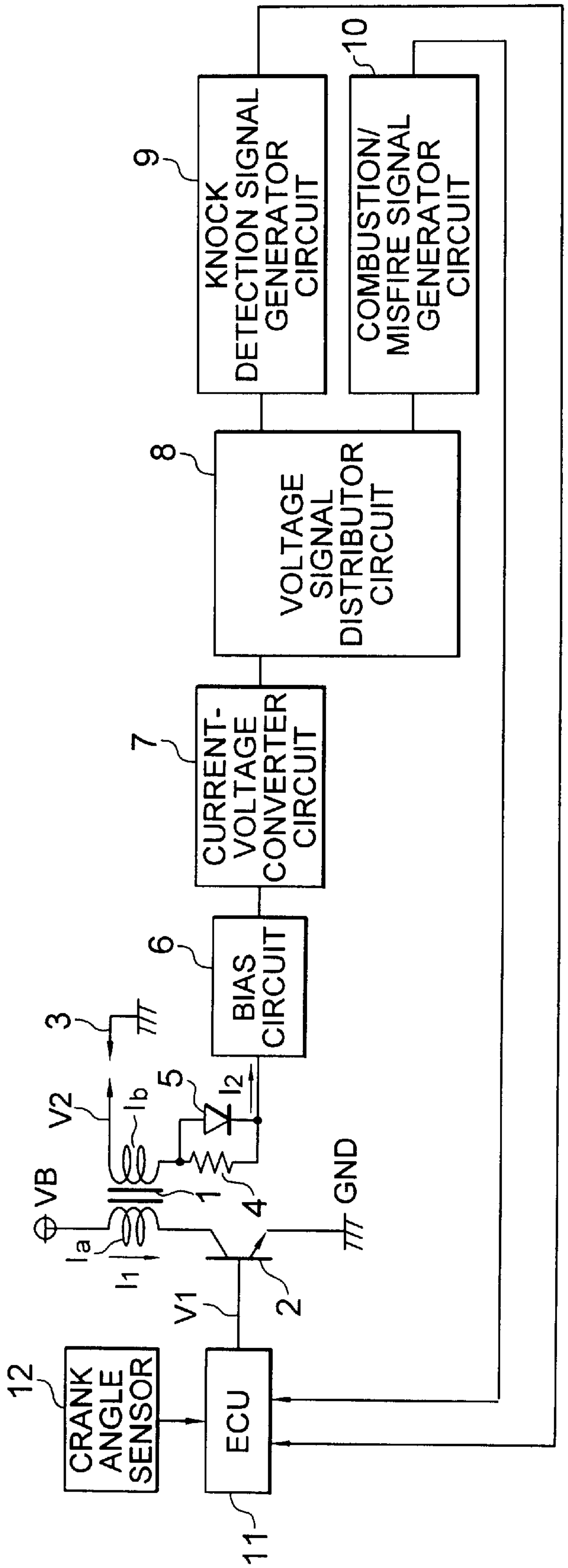
FIG. 6 is a structural diagram showing a conventional combustion state detecting device for an internal combustion engine.
Figure 7:
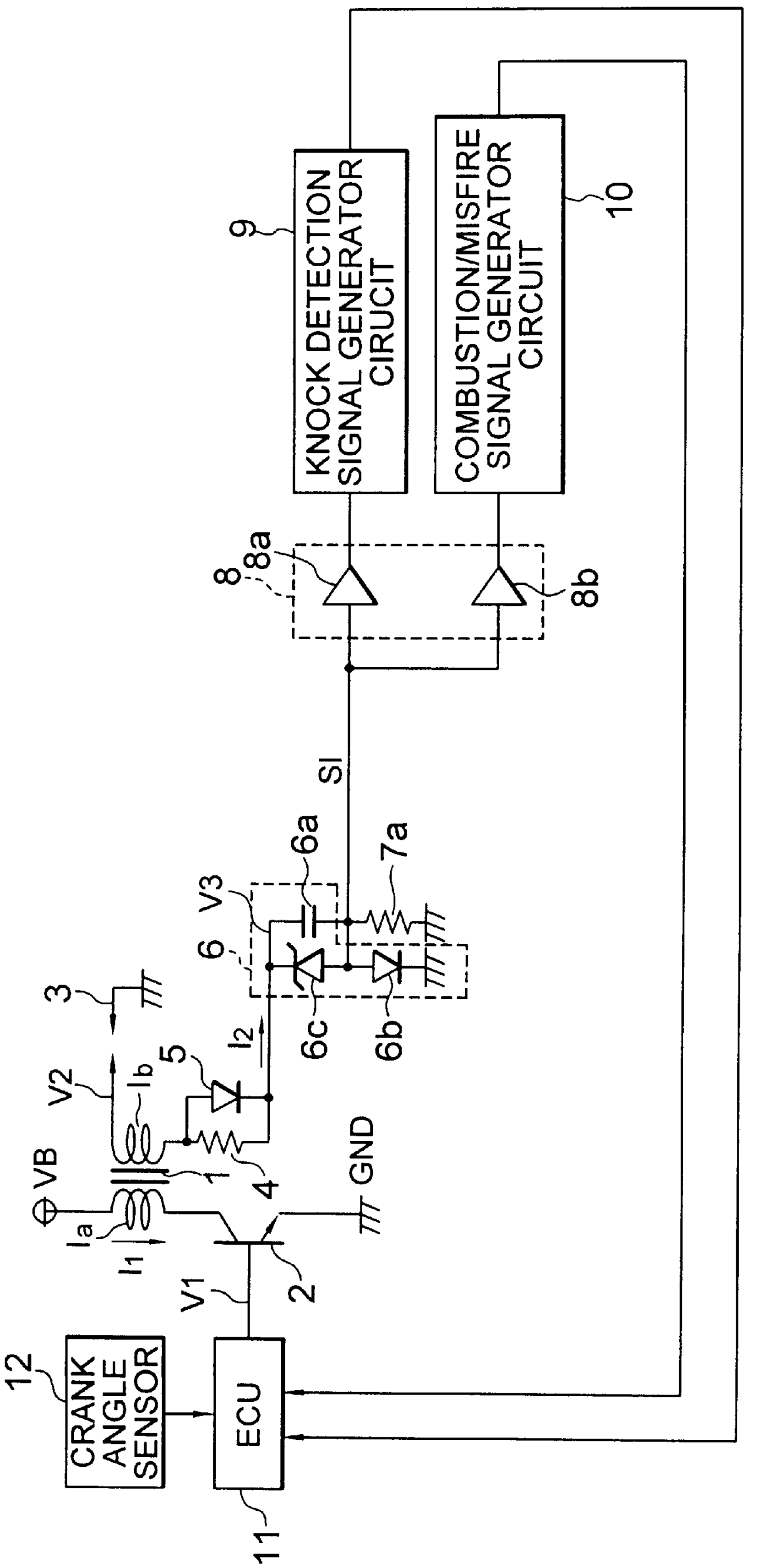
FIG. 7 is a circuit structural diagram showing one specific example of parts of the combustion state detecting device shown in FIG. 6.
Figures 8A, 8B, 8C, 8D, 8E, 8F:
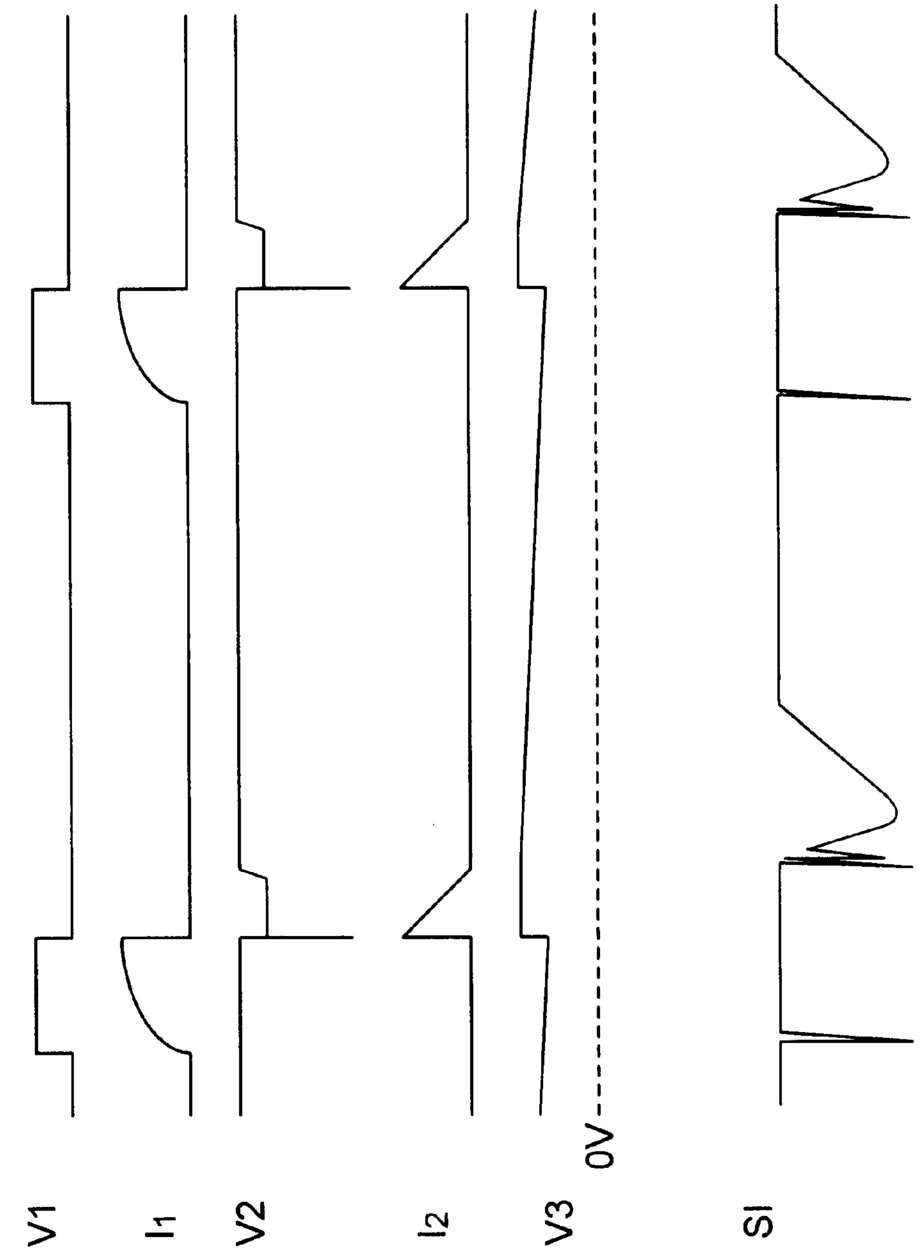
FIGS. 8A to 8F are graphs for explanation of the operation of the conventional combustion state detecting device for an internal combustion engine.

FIG. 1 is a structural diagram showing an example of a combustion state detecting device for an internal combustion engine in accordance with a first embodiment of the present invention, in which parts corresponding to those in FIG. 6 are indicated by the same references, and their duplicated description will be omitted.

In this embodiment, an ion current signal distributor circuit 20 that distributes an ion current signal is disposed at a post-stage of a bias circuit 6 as ion current detection voltage generating means, so that the ion current signals are supplied to a knock detection signal generator circuit 9 and a combustion/misfire signal generator circuit 10 through current-voltage converter circuits 21 and 22 that convert the ion current signals distributed by the ion current signal distributor circuit 20 into voltages, respectively. The ion current signal distributor circuit 20 and the current-voltage converter circuits 21 and 22 constitute ion current detecting means. The other structures are identical with those in FIG. 6.

Figure 2:
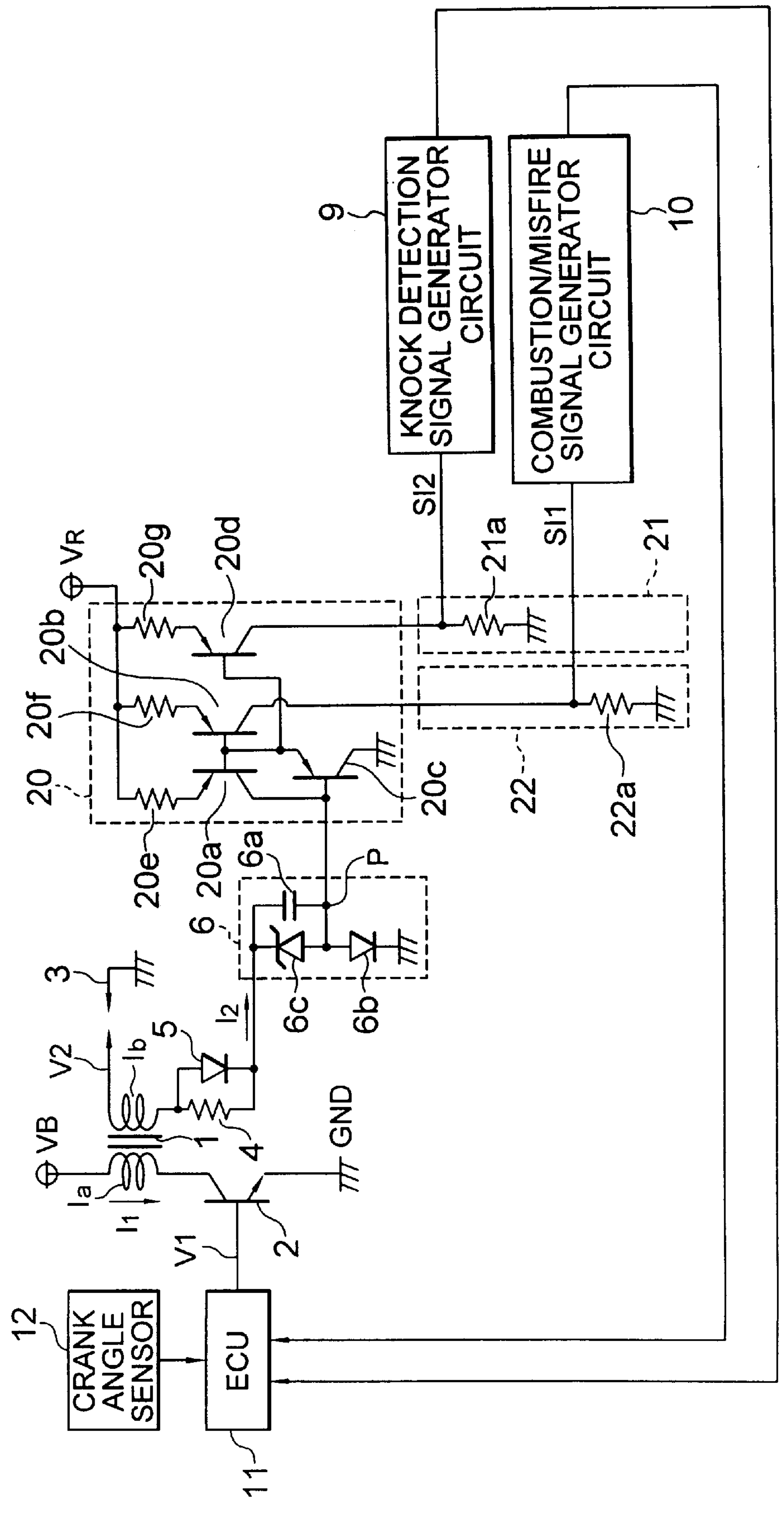
FIG. 2 is a circuit structural diagram showing one specific example of parts of the combustion state detecting device shown in FIG. 1.

FIG. 2 is a circuit structural diagram showing one specific example of the ion current signal distributor circuit and the current-voltage converter circuit shown in FIG. 1.

In the figure, the ion current signal distributor circuit 20 is made up of a current mirror circuit including transistors 20*a* to 20*d* and resistors 20*e* to 20*g*. The respective emitters of the transistors 20*a* and 20*b* are connected to a power supply terminal $V_R$ through the resistors 20*e* and 20*f*, respectively, and the respective bases thereof are commonly connected to each other and connected to the emitter of the transistor 20*c*.

The collector of the transistor 20*a* is commonly connected to the base of the transistor 20*c* and connected to the output side of the bias circuit 6, that is, a node P of a capacitor 6*a* and the respective anodes of a diode 6*b* serving as a rectifier element and a Zener diode 6*c* serving as a voltage limiting element, and the collector of the transistor 20*c* is grounded.

The collector of the transistor 20*b* is connected to one end of a resistor 22*a* in the current-voltage converter circuit 22, and a node of those elements is connected to an input side of the combustion/misfire signal generator circuit 10, and the other end of the resistor 22*a* is grounded.

The emitter of the transistor 20*d* is connected to a given voltage source $V_R$ through the resistor 20*g*, and the base thereof is connected to the emitter of the transistor 20*c*. Also, the collector of the transistor 20*d* is connected to one end of a resistor 21*a* in the current-voltage converter circuit 21, and a node of those elements is connected to an input side of the knock detection signal generator circuit 9, and the other end of the resistor 21*a* is grounded.

Subsequently, the operation of the combustion state detecting device thus structured will be described with reference to FIGS. 3A to 3G.

In general, an ECU 11 arithmetically operates an ignition timing, etc., in accordance with drive conditions, and supplies an ignition signal V1 (FIG. 3A) to a base of a power transistor 2 at a targeted control timing to control the on/off operation of the power transistor 2.

As a result, the power transistor 2 interrupts the supply of a primary current I1 (FIG. 3B) flowing in a primary winding 1*a* of an ignition coil 1 to boost a primary voltage, and also develops an ignition high voltage, a secondary voltage V2 of, for example, several tens kV (FIG. 3C) at the high-voltage side of a secondary winding 1*b*.

The secondary voltage is applied to an ignition plug 3 for each of the cylinders and allowed to generate a discharge spark within the combustion chamber of an ignition control cylinder to burn the fuel-air mixture. In this situation, if the combustion state is normal, a required quantity of ions are generated in the periphery of the ignition plug 3 and within the combustion chamber.

Then, as described above, when the power transistor 2 is turned on in response to the ignition signal V1, the supply of the current in the primary winding 1*a* starts, to thereby develop the voltage of the positive polarity at the high-voltage side of the secondary winding 1*b*.

At this time, since the discharge current from the capacitor 6*a* to the low-voltage side of the secondary winding 1*b* is limited by the resistor 4, the voltage developed at the secondary winding 1*b* is divided to the high-voltage side and the low-voltage side without being superimposed on the bias voltage.

At the time of starting the supply of a current to the primary winding 1*a*, even if the voltage of the positive polarity is developed at the high-voltage side of the secondary winding 1*b*, since the discharge current from the capacitor 6*a* to the low-voltage side of the secondary winding 1*b* is limited by the resistor 4 as described above, the voltage of the positive polarity developed at the high-voltage side of the secondary winding 1*b* is suppressed so that there is no case in which the ignition plug 3 discharges.

Figures 3A, 3B, 3C, 3D, 3E, 3F, 3G:
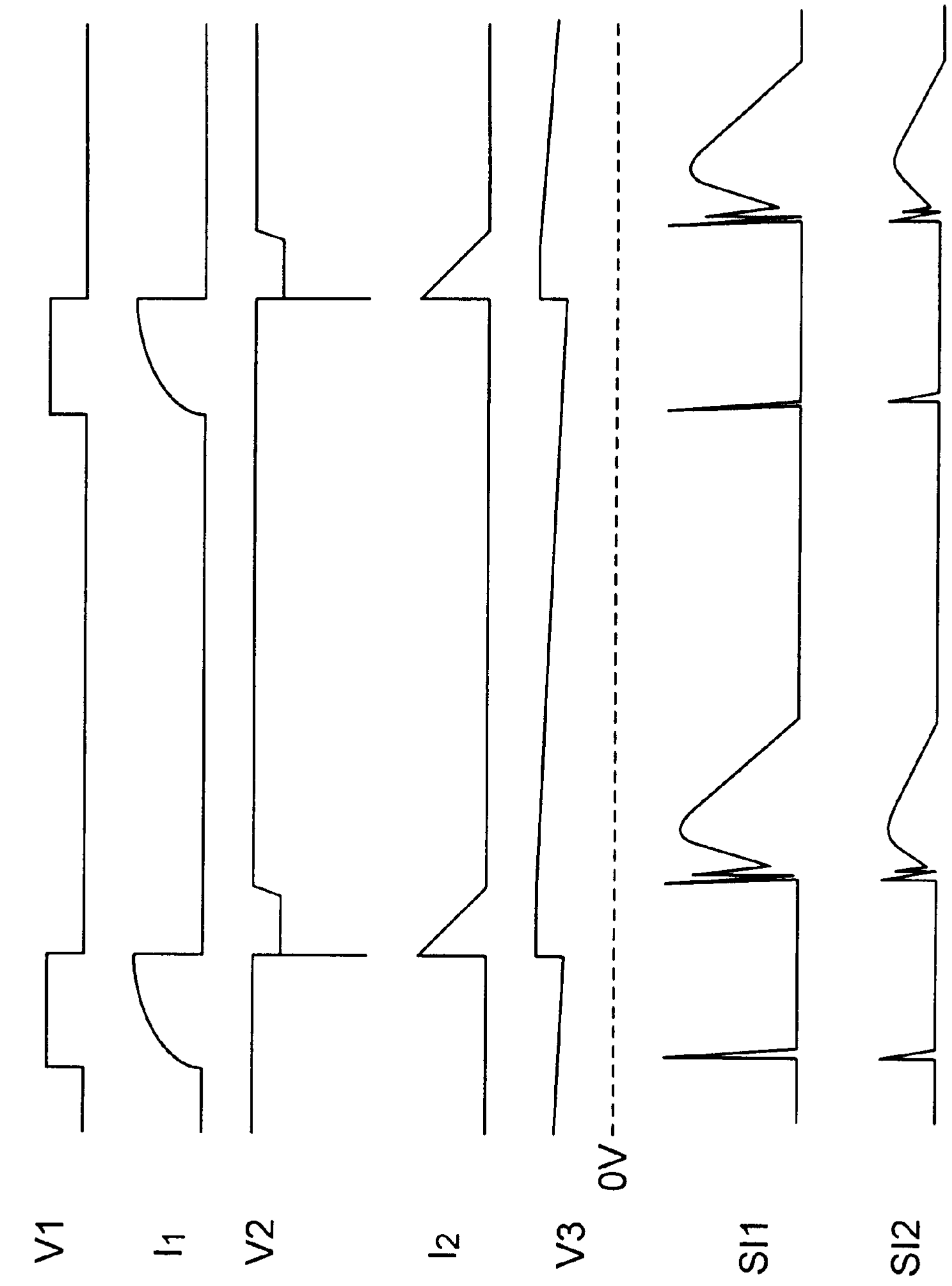
FIGS. 3A to 3G are graphs for explanation of the operation of the combustion state detecting device in accordance with the first embodiment of the present invention.

Sequentially, at the time of interrupting the primary current, when the ignition high voltage is developed at the high-voltage side of the secondary winding 1*b* to make the ignition plug 3 discharge, the secondary current I2 (FIG. 3D) then flows in a path of the ignition plug 3, the secondary coil 1*b*, the diode 5, the capacitor 6*a*, the diode 6*b* and the ground in the stated order to charge the capacitor 6*a* to a given voltage V3 (FIG. 3E).

When the charge voltage of the capacitor 6*a* reaches a given voltage value of the Zener diode 6*c*, the secondary current flows into the Zener diode 6*c* without flowing into the capacitor 6*a*, to thereby maintain the given bias voltage.

Upon the completion of the discharge by the ignition plug 3, the ion current flows in a path of the collector of the transistor 20*a*, the capacitor 6*a*, the resistor 4 and the secondary coil 1*b* in the stated order, toward the ignition plug 3.

The transistor 20*a* substantially functions as the reference current generator element of the current mirror circuit, and a current equivalent to the current flowing out of the node P flows in the transistor 20*a*. Then, a current flows in the transistors 20*b* and 20*d* with the current flowing the transistor 20*a* as a reference. In this manner, with one ion current as a reference, a plurality of currents analogous to the ion current can be produced.

The currents flowing in the transistors 20*b* and 20*d* are converted into voltages by the resistor 22*a* of the current-voltage converter circuit 22 and the resistor 21*a* of the current-voltage converter circuit 21, respectively, and then extracted as ion signals SI1 (FIG. 3F) and SI2 (FIG. 3G).

Then, the ion signal SI2 from the resistor 21*a* is supplied to the knock detection signal generator circuit 9 where a knock detection signal is produced. Also, the ion signal SI1 from the resistor 22*a* is supplied to the combustion/misfire signal generator circuit 10 where a combustion/misfire detection signal is produced.

Then, the output signals from the knock detection signal generator circuit 9 and the combustion/misfire signal generator circuit 10 are supplied to the ECU 11, and the ECU 11 produces and outputs a variety of control signals such as the above-described ignition signal and drive signals on the basis of those output signals and the detection signals from a variety of sensors (not shown) such as a crank angle sensor 12.

FIGS. 3A to 3G show a case in which the ion signals SI1 and SI2 distributed and outputted from the current mirror circuit which constitutes the ion current signal distributor circuit 20 are different in level from each other, but, they may be identical in level with each other.

As described above, in this embodiment, with one ion current as a reference, a plurality of currents analogous to the ion current can be produced, and diverse combustion state detection can be made by use of those plural currents. In addition, since a plurality of currents analogous to the ion current can be produced, a signal source having a plurality of dynamic ranges with respect to one ion signal can be substantially obtained, with the results that signal processing for conducting knocking detection, combustion/misfire detection and other combustion state detection can be facilitated, and a signal processing circuit at a post-stage can be also simplified.

(Second Embodiment)

In the above first embodiment, the current that flows in the transistors 20*b* and 20*d* in the current mirror circuit which constitutes the ion current signal distributor circuit 20 flows in proportion to its chip size with respect to the current that flows in the transistor 20*a*. Accordingly, a plurality of dynamic ranges can be set by changing the chip size of the respective transistors. Also, because the current-voltage conversion is conducted for each of those currents individually, the dynamic range can be set, individually, even at a current-voltage conversion stage.

Therefore, current waveforms substantially different in the level of the ion current can be obtained as with the ion signals SI1 and SI2 shown in FIGS. 3A to 3G, by changing the chip size of the transistor or the dynamic range of the ion current at the current-voltage conversion stage.

As described above, in this embodiment, appropriate dynamic ranges can be set for the respective combustion state detection, with one ion current as a reference, to thereby improve the properties of diverse combustion state detection such as the property of knock detection or the property of combustion/misfire detection.

(Third Embodiment)

In the above first embodiment, knocking detection or combustion/misfire detection is made by use of the individual ion signals distributed by the current mirror circuit that constitutes the ion current signal distributor circuit 20. For example, in order to surely judge combustion/misfire, because it is necessary to detect even remarkably small ion current of several $\mu$A, the dynamic range is set so that the ion current increases in level.

Also, in order to detect knock, the dynamic range is set so that an ion current waveform is not saturated.

For this setting, the dynamic range may be set, for example, at the current-voltage conversion stage where fine setting is enabled, that is, the resistance of the resistors 21*a* and 22*a* may be adjusted.

As described above, in this embodiment, appropriate dynamic ranges can be finely set for the respective combustion state detection, to thereby further improve the properties of diverse combustion state detection such as the property of knock detection or the property of combustion/misfire detection.

(Fourth Embodiment)

Figure 4:
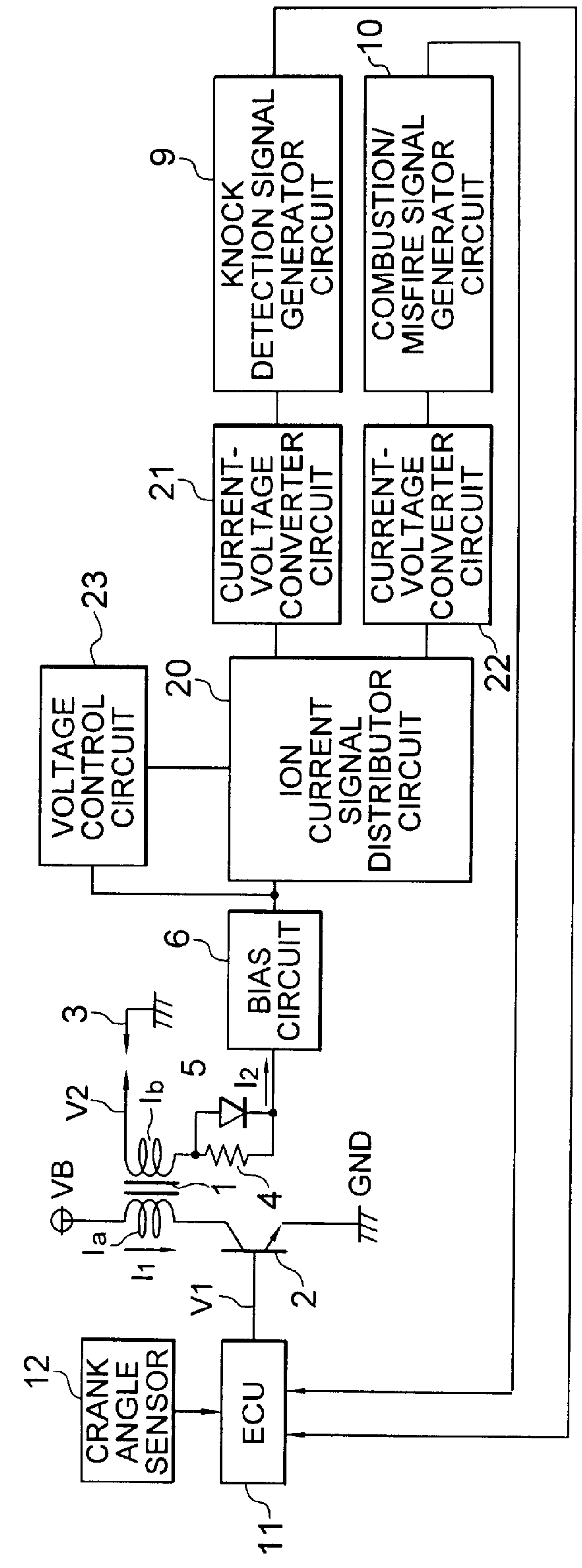
FIG. 4 is a structural diagram showing a combustion state detecting device for an internal combustion engine in accordance with a fourth embodiment of the present invention.

FIG. 4 is a structural diagram showing an example of a combustion state detecting device for an internal combustion engine in accordance with a fourth embodiment of the present invention, in which parts corresponding to those in FIG. 1 are indicated by the same references, and their duplicated description will be omitted.

In this embodiment, there is used a voltage control circuit 23 feeds a voltage at the low-voltage side, that is, the output side of the bias circuit 6 back to a zero volt under control. The other structures are identical with those in FIG. 2.

Figure 5:
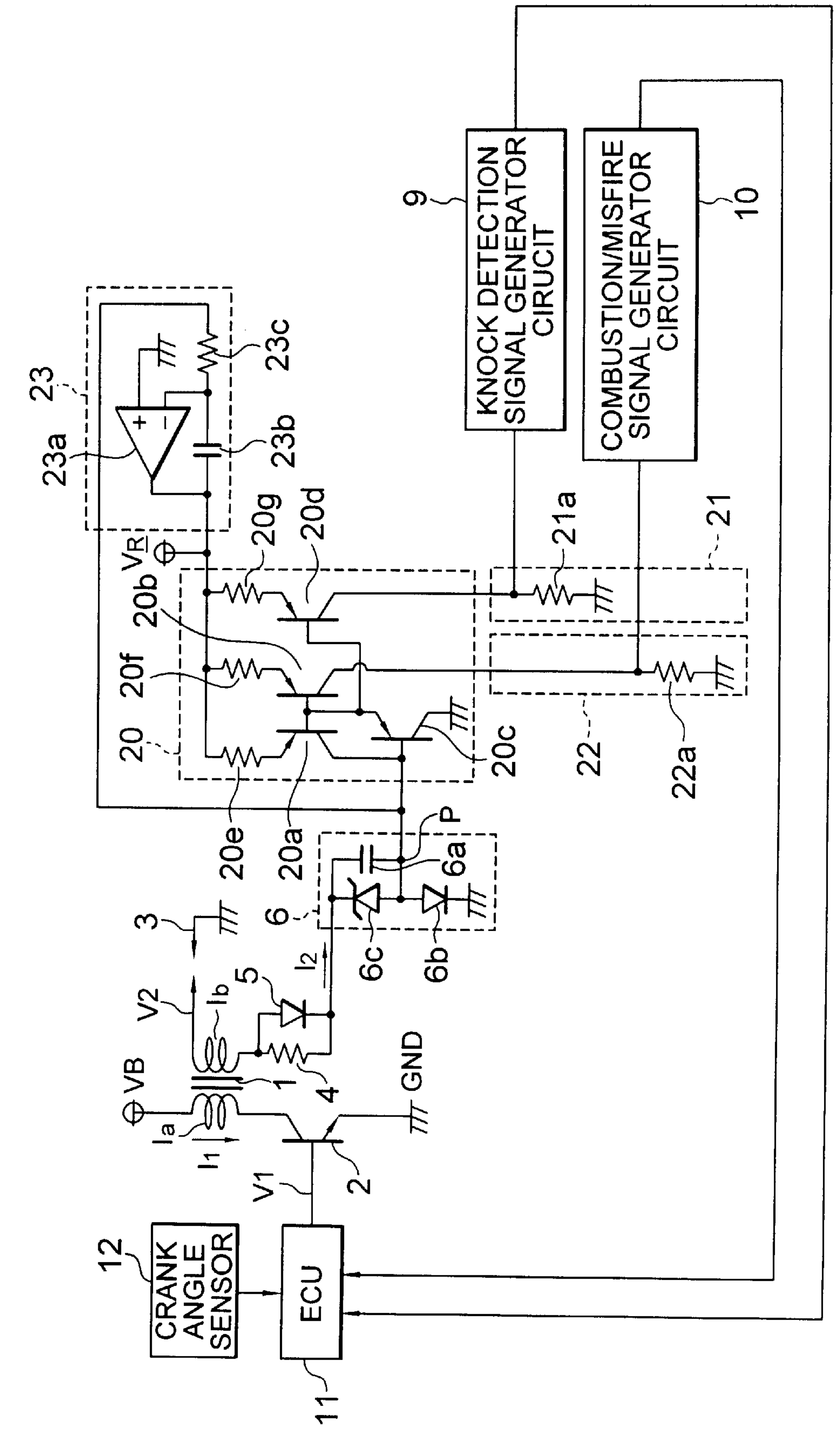
FIG. 5 is a circuit structural diagram showing one specific example of parts of the combustion state detecting device shown in FIG. 4.

FIG. 5 is a circuit structural diagram showing one specific example of parts of the voltage control circuit adapted to the circuit shown in FIG. 1.

In the figure, voltage control circuit 23 includes an operational amplifier 23*a*, a capacitor 23*b* connected to an inverse input terminal and an output terminal of the operational amplifier 23*a*, and a resistor 23*c* one end of which is connected to the inverse input terminal of the operational amplifier 23*a*. The non-inverse input terminal of the operational amplifier 23*a* is grounded, an output terminal of the operational amplifier 23*a* is connected to a common node of the resistors 20*e* to 20*g* in the current mirror circuit, and the other end of the resistor 23*c* is connected to the node P.

Subsequently, the operation of the combustion state detecting device thus structured will be described.

As in the above description, a current equivalent to the current flowing out of the node P flows in the transistor 20*a*, as a result of which a current flows in the transistors 20*b* and 20*d* with the current flowing in the transistor 20*a* as a reference. In this manner, a plurality of currents analogous to one ion current are produced with the one ion current as a reference.

Then, the voltage control circuit 23 conducts feedback control such that a voltage at the low-voltage side of the capacitor 6*a* in the bias circuit 6, that is, at the node P is always maintained to be zero volt. The other operations are identical with those in the first embodiment, and therefore their description will be omitted.

As described above, in this embodiment, a current equivalent to the ion current can be allowed to accurately flow in the current mirror, and the properties of diverse combustion state detection such as the property of knock detection or the property of combustion/misfire detection can be further improved.

(Fifth Embodiment)

It should be noted that the above respective embodiments are cases in which the present invention is applied to knocking detection or combustion/misfire detection. However, the present invention may be applied to other cases requiring the same signal processing, for example, EGR control, A/F control or the like in which the output of the combustion/misfire signal generator circuit is taken in the ECU. Also, the manners employed in the second and third embodiments are applicable to the circuit of the fourth embodiment, likewise.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A combustion state detecting device for an internal combustion engine, comprising:

ion current detection voltage generating means for applying an ion current detection voltage to an ignition plug disposed in a cylinder of the internal combustion engine; and ion current detecting means for detecting an ion current on the basis of a voltage from said ion current detection voltage generating means, wherein said ion current detecting means produces a plurality of currents analogous to the ion current.

2. A combustion state detecting device for an internal combustion engine as claimed in claim 1, wherein said ion current detection voltage generating means comprises:

a capacitor which is charge to hold a voltage;

a voltage limiting element that limits the charge voltage of said capacitor; and a rectifier element disposed between an electrode of said capacitor at a low potential side thereof and ground, for causing the current from said capacitor to flow to ground, and wherein said ion current detecting means comprises a current mirror circuit.

3. A combustion state detecting device for an internal combustion engine as claimed in claim 1, wherein dynamic ranges are set for respective ones of the plurality of analogous currents produced by said ion current detecting means.

4. A combustion state detecting device for an internal combustion engine as claimed in claim 1, wherein knocking detection and combustion/misfire detection are effected by use of the plurality of analogous currents produced by said ion current detecting means.

5. A combustion state detecting device for an internal combustion engine as claimed in claim 1, further comprising a voltage control circuit for feeding a voltage at a low-voltage side of said ion current detection voltage generating means back to 0 volt under control.

6. A combustion state detecting device for an internal combustion engine, comprising:

ion current generating means for producing a generated ion current based on an ion current of an ignition plug disposed in a cylinder of the internal combustion engine; and ion current detecting means for detecting a reference ion current on the basis of the generated ion current from said ion current generating means, wherein said ion current detecting means produces a plurality of currents based on the reference ion current and analogous to the generated ion current.

7. A combustion state detecting device for an internal combustion engine as claimed in claim 6, wherein said ion detection current generating means comprises:

a capacitor which is charged by a voltage;

a voltage limiting element that limits the charge voltage of said capacitor; and a rectifier element disposed between an electrode of said capacitor at a low potential side thereof and ground, for causing the current from said capacitor to flow to ground, and wherein said ion current detecting means comprises a current mirror circuit.

8. A combustion state detecting device for an internal combustion engine as claimed in claim 6, wherein dynamic ranges are set for respective ones of the plurality of analogous currents produced by said ion current detecting means.

9. A combustion state detecting device for an internal combustion engine as claimed in claim 6, wherein knocking detection and combustion/misfire detection are effected by use of the plurality of analogous currents produced by said ion current detecting means.

10. A combustion state detecting device for an internal combustion engine as claimed in claim 6, further comprising a voltage control circuit for feeding a voltage at a low-voltage side of said ion current generating means back to 0 volt under control.

* * * * *